United States Patent
Huang et al.

(10) Patent No.: US 12,415,756 B2
(45) Date of Patent: Sep. 16, 2025

(54) METHOD OF MANUFACTURING INORGANIC BINDER BY REDUCTION FURNACE SLAG AND CURED SOLID MANUFACTURED BY THE METHOD

(71) Applicants: National Cheng Kung University, Tainan (TW); SanFan Internal investment CO., LTD., Tainan (TW)

(72) Inventors: Jong-Shin Huang, Tainan (TW); Wen-Pi Ko, Tainan (TW); Ting-Chun Lin, Tainan (TW)

(73) Assignees: National Cheng Kung University, Tainan (TW); SanFan Internal investment CO., LTD., Tainan (TW)

( * ) Notice: Subject to any disclaimer, the term of this patent is extended or adjusted under 35 U.S.C. 154(b) by 453 days.

(21) Appl. No.: 17/994,198

(22) Filed: Nov. 25, 2022

(65) Prior Publication Data

US 2023/0192551 A1 Jun. 22, 2023

(30) Foreign Application Priority Data

Dec. 16, 2021 (TW) ................. 110147304

(51) Int. Cl.
| | | |
|---|---|---|
| *C04B 28/08* | (2006.01) |
| *C04B 7/147* | (2006.01) |
| *C04B 7/40* | (2006.01) |
| *C04B 7/43* | (2006.01) |
| *C04B 20/10* | (2006.01) |

(52) U.S. Cl.
CPC ............ *C04B 28/082* (2013.01); *C04B 7/147* (2013.01); *C04B 7/40* (2013.01); *C04B 7/43* (2013.01); *C04B 20/1074* (2013.01)

(58) Field of Classification Search
CPC .... B09B 3/00; B09B 3/38; B09B 3/40; B09B 3/70; B09B 2101/55; C04B 28/082; C04B 7/147; C04B 7/40; C04B 7/43; C04B 20/1074; C04B 5/00; C04B 28/006; C04B 20/06; Y02P 40/10

See application file for complete search history.

(56) References Cited

FOREIGN PATENT DOCUMENTS

| CN | 110655375 A | * | 1/2020 |
| CN | 110981340 A | * | 4/2020 |
| WO | 2020070670 A1 | | 4/2020 |

OTHER PUBLICATIONS

"Electric Arc Furnace Reducing Slag Stabilization Technical Manual", Industrial Development Bureau, Ministry of Economic Affairs, Dec. 2016; with English abstract.
Chen, J., "Silicon-Contained Waste as a Raw Material of Inorganic Polymers", (PhD thesis), National Cheng Kung University, Jun. 2010; with English abstract.
Taiwan Patent Office, Office Action, Patent Application Serial No. TW110147304, issued Nov. 3, 2022.
Torres, J. J. et al., "Alkaline Chemical Activation of Urban Glass Wastes to Produce Cementituous Materials", 1st Spanish National Conference on Advances in Materials Recycling and Eco—Energy, Madrid, Nov. 12-13, 2009, S04-6, pp. 111-114.

* cited by examiner

*Primary Examiner* — Anthony J Green
(74) *Attorney, Agent, or Firm* — RABIN & BERDO, P.C.

(57) ABSTRACT

A method of manufacturing inorganic binder by reduction furnace slag includes a raw material preparation step, a stirring step, a maintaining step and a drying step. The raw material preparation step is to provide a powder mixture containing 30 wt % to 55 wt % of reduction furnace slag, and 45 wt % to 70 wt % of glass powder. The stirring step is to place the powder mixture in a mixing tank, and add an alkali activator to the mixing tank to stir and react to form mixed slurry. The alkali equivalent (AE) of the mixed slurry is 2% to 7%, and the water-binder ratio is 0.25 to 0.4. The maintaining step is to place the mixed slurry in a high-temperature and high pressure maintaining environment for a maintaining time to get a binder. The drying step is to dry the binder.

18 Claims, 4 Drawing Sheets

METHOD OF MANUFACTURING INORGANIC BINDER BY REDUCTION FURNACE SLAG AND CURED SOLID MANUFACTURED BY THE METHOD

CROSS-REFERENCE TO RELATED APPLICATION

This non-provisional application claims priority under 35 U.S.C. § 119(a) to Patent Application No. 110147304 filed in Taiwan, R.O.C. on Dec. 16, 2021, the entire contents of which are hereby incorporated by reference.

BACKGROUND

Technical Field

The disclosure relates to the field of waste regeneration, in particular to a method of manufacturing an inorganic binder by reduction furnace slag and a cured solid manufactured by the method.

Related Art

The electric arc furnace steelmaking operation procedure may be divided into three stages: a melting period, an oxidation period and a reduction period. In the melting period, scrap steel is melted by high temperature electric arc to form molten steel. In the oxidation period, high-pressure oxygen is injected to accelerate the oxidation, and a large amount of impurities are generated under the oxidation action. The generated impurities are gaseous oxide slag and solid oxides. At this time, the molten steel has an excessively high oxygen content and needs to be reduced.

Finally, in the reduction period, a large amount of auxiliary materials such as limestone and coke are added. Through the reduction reaction, oxygen in the molten steel is taken out and scum is generated. In addition, impurities such as sulfur in the molten steel can be removed to clean the molten steel. Steel slag is separated from the molten steel by their difference in specific gravity. The discharged furnace slag is cooled to obtain reduction furnace slag of electric arc furnaces.

The reduction furnace slag of electric arc furnaces is the main waste of the steelmaking industry. According to the 2020 Statistical Report on Declaration of Industrial Wastes, there was about 260000 tons of reduction furnace slag of electric arc furnace steelmaking, which thereby is an industrial waste that needs to be dealt with urgently. Since the reduction furnace slag mostly comes from steel plants and contains a high proportion of heavy metals, if it is directly buried, there may be a problem of heavy metal dissolution.

Therefore, the research both at home and abroad focuses on the related art of reutilization of reduction furnace slag of electric arc furnaces. At present, since the reduction furnace slag has pulverized fine particles and its chemical composition is between cement and granulated blast-furnace slag, the research on the reduction furnace slag tends to develop towards its application in cement materials. The reduction furnace slag is mainly composed of calcium oxide, magnesium oxide, silicon dioxide, aluminum oxide, sulfides and manganese oxide. After the reduction furnace slag undergoes hydration reaction, the resulting free calcium oxide and free manganese oxide may result in volume expansion, causing cracking or even damage to the concrete, which limits the application of the reduction furnace slag in concrete works. Besides, the hydrated reduction furnace slag has insufficient overall strength, generally lower than 12 MPa, which is lower than the minimum standard 15 MPa for structural applications. Therefore, the reduction furnace slag can only be used as a non-structural ready-mixed concrete material and cement material. In addition, if the concrete is cracked, the furnace slag will be exposed, so there is still a problem of strong alkali pollution caused by heavy metals.

SUMMARY

In order to solve the problems in the related art, provided is a method of manufacturing an inorganic binder by reduction furnace slag. The method of manufacturing an inorganic binder by reduction furnace slag includes a raw material preparation step, a stirring step, a maintaining step and a drying step. The raw material preparation step is to provide a powder mixture containing 30 wt % to 55 wt % of reduction furnace slag powder and 45 wt % to 70 wt % of glass powder. The glass powder contains more than 85 wt % of $SiO_2$, and the reduction furnace slag powder contains 26 wt % to 62 wt % of CaO, 20 wt % to 32 wt % of $SiO_2$ and 1.8 wt % to 12.5 wt % of $Al_2O_3$.

The stirring step is to place the powder mixture in a mixing tank, and add an alkali activator to the mixing tank to stir and react to form a mixed slurry. The alkali equivalent (AE) of the mixed slurry is 2% to 7%, and the water-binder ratio is 0.25 to 0.4. Here, the alkali equivalent is defined as Equation (1), and the water-binder ratio is defined as Equation (2).

$$\text{alkali equivalent} = \frac{\text{Weight of Na}_2\text{O in alkali activator}}{\text{Weight of powder mixture}} * 100\%. \quad \text{Equation (1)}$$

$$\text{water-binder ratio}(W/B) = \frac{\text{Weight of water in alkali activator} + \text{weight of additional water}}{\text{Weight of solid in alkali activator} + \text{weight of powder mixture}}. \quad \text{Equation (2)}$$

The maintaining step is to place the mixed slurry in a high-temperature and high-pressure maintaining environment for a maintaining time to get a binder. The high-temperature and high-pressure maintaining environment is a temperature of 80 to 250° C. and a pressure of 0.3 to 2.5 MPa, and the maintaining time is 0.5 to 24 hours. The drying step is to dry the binder.

In some embodiments, the alkali activator is NaOH, and the alkali equivalent of the mixed slurry is 4% to 6%.

In some embodiments, before the maintaining step, the method further includes a slurry shaping step: placing the mixed slurry in a shaping mold, and holding at an environment of 60 to 100° C. for 40 to 180 minutes.

In some embodiments, the reduction furnace slag powder further contains less than 20 wt % of MgO, less than 5% of MnO and less than 18% of $Fe_2O_3$.

In some embodiments, the source of the glass powder is selected from the group consisting of common glass, electronic grade glass fiber and glass substrate.

In some embodiments, the glass powder further contains 9 wt % to 15 wt % of CaO.

In some embodiments, a specific surface area of the reduction furnace slag powder is in a range of 1900 to 2600 cm²/g, and a specific surface area of the glass powder is in a range of 3500 to 5000 cm²/g.

In some embodiments, the high-temperature and high-pressure maintaining environment is a temperature of 150 to 230° C. and a pressure of 0.5 to 2 MPa, and the maintaining time is 2 to 4 hours.

In some embodiments, the alkali activator and the powder mixture are stirred for 10 to 30 minutes.

Here, further provided is an inorganic binder cured solid, manufactured by the method of manufacturing an inorganic binder by reduction furnace slag according to the foregoing embodiments.

As described in the foregoing embodiments, by adding the waste glass and the reduction furnace slag powder, the overall silicon content can be increased. Therefore, under the alkali activation of the alkali activator, silicon and aluminum ions in the slurry can be dehydrated to initiate a polycondensation reaction so as to form a silicon-aluminum-based network architecture, which can become a hardened cured solid after being maintained and dried. The cured solid has sufficient strength to serve as a structure. Besides, the heavy metals in the reduction furnace slag can be wrapped in the network architecture, such that their dissolution is far below the standard. Thereby, the reduction furnace slag can be reutilized effectively, and recycled at low cost on a large scale, which can reduce the problems caused by burying. Moreover, the reduction furnace slag can be reused, thereby effectively reducing the impact on the environment.

DETAILED DESCRIPTION

Figure 1:
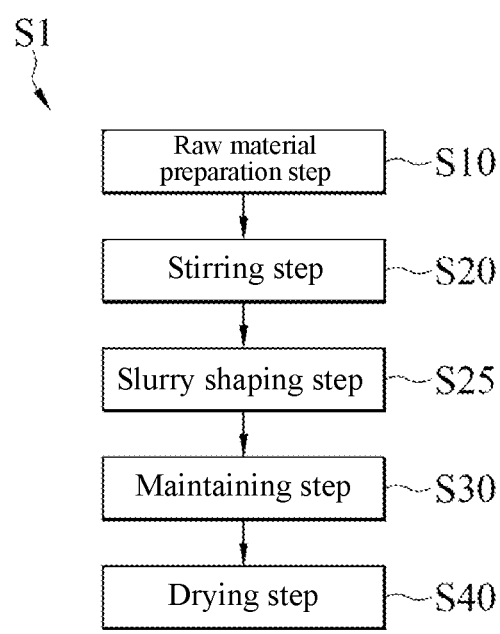
FIG. 1 is a flowchart of a method of manufacturing an inorganic binder by reduction furnace slag.
Figure 2:
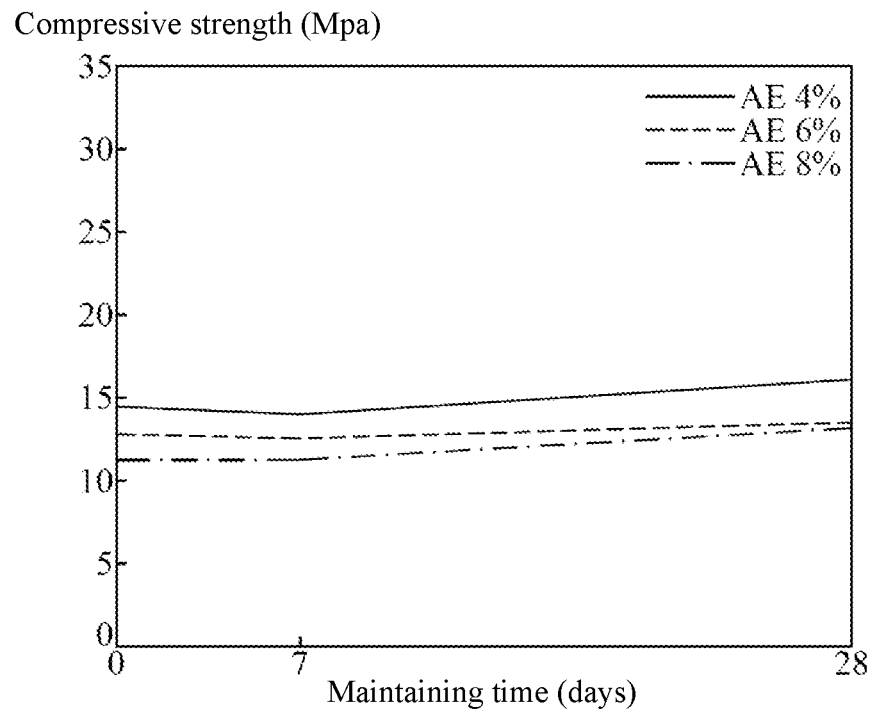
FIG. 2 is a curve graph showing compressive strength of the inorganic binder under 0.5 Mpa for 2 hours from 0 to 28 days.
Figure 3:
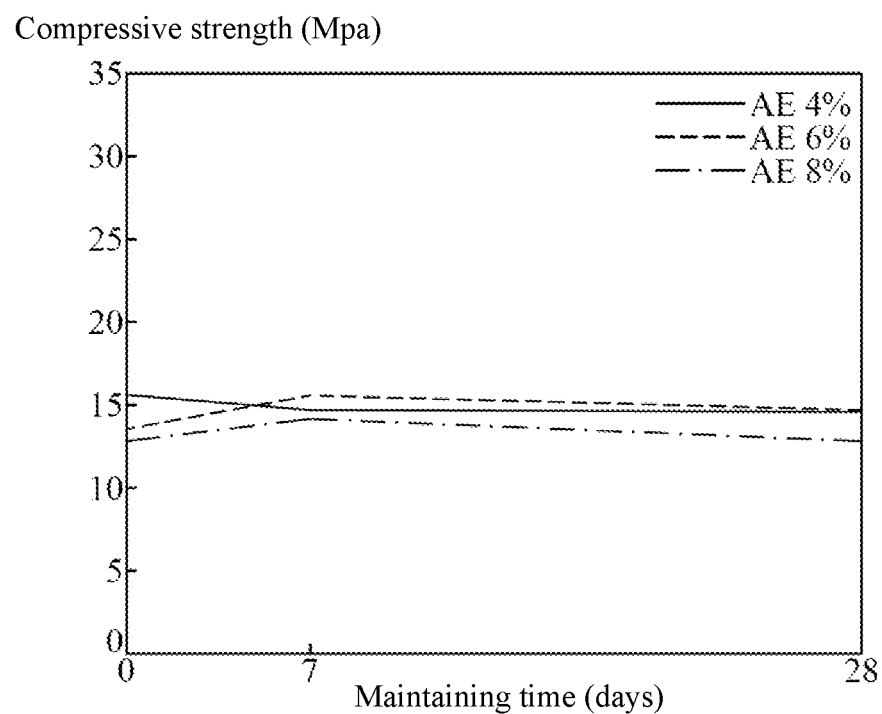
FIG. 3 is a curve graph showing compressive strength of the inorganic binder under 0.5 Mpa for 4 hours from 0 to 28 days.
Figure 4:
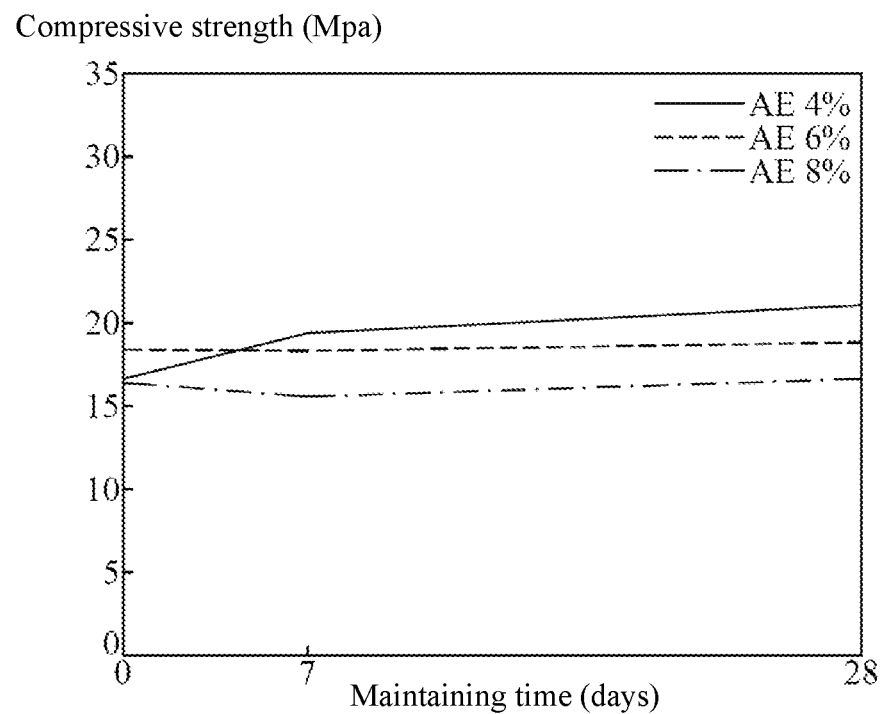
FIG. 4 is a curve graph showing compressive strength of the inorganic binder under 1 Mpa for 2 hours from 0 to 28 days.
Figure 5:
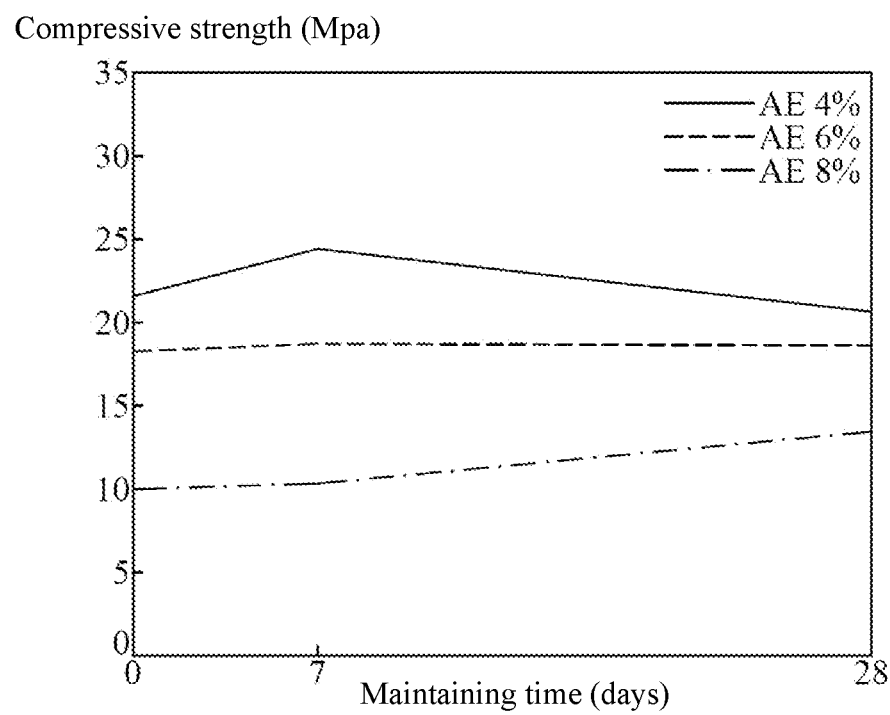
FIG. 5 is a curve graph showing compressive strength of the inorganic binder under 1 Mpa for 4 hours from 0 to 28 days.
Figure 6:
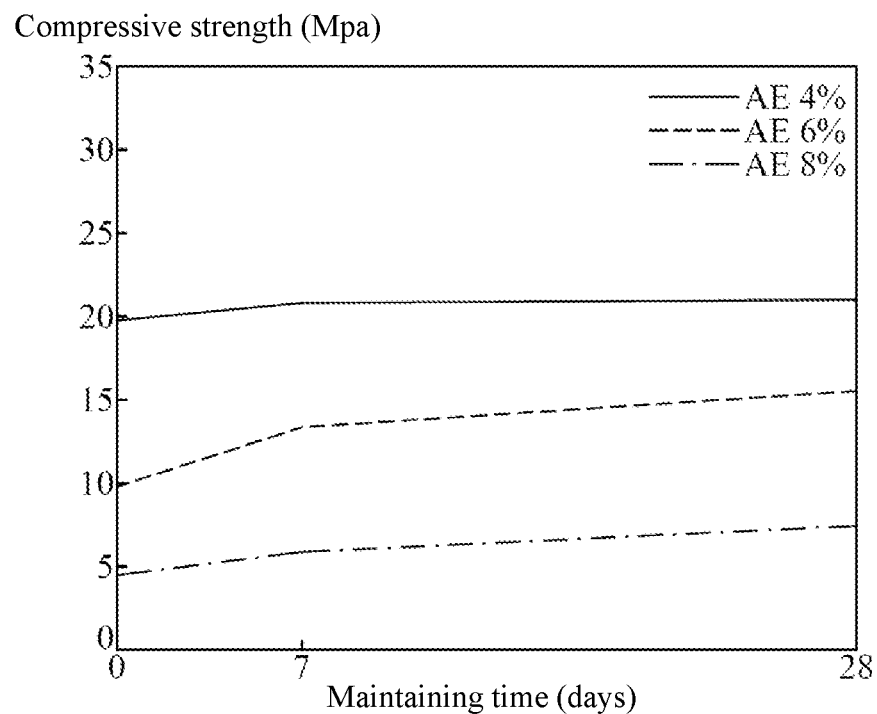
FIG. 6 is a curve graph showing compressive strength of the inorganic binder under 2 Mpa for 2 hours from 0 to 28 days.
Figure 7:
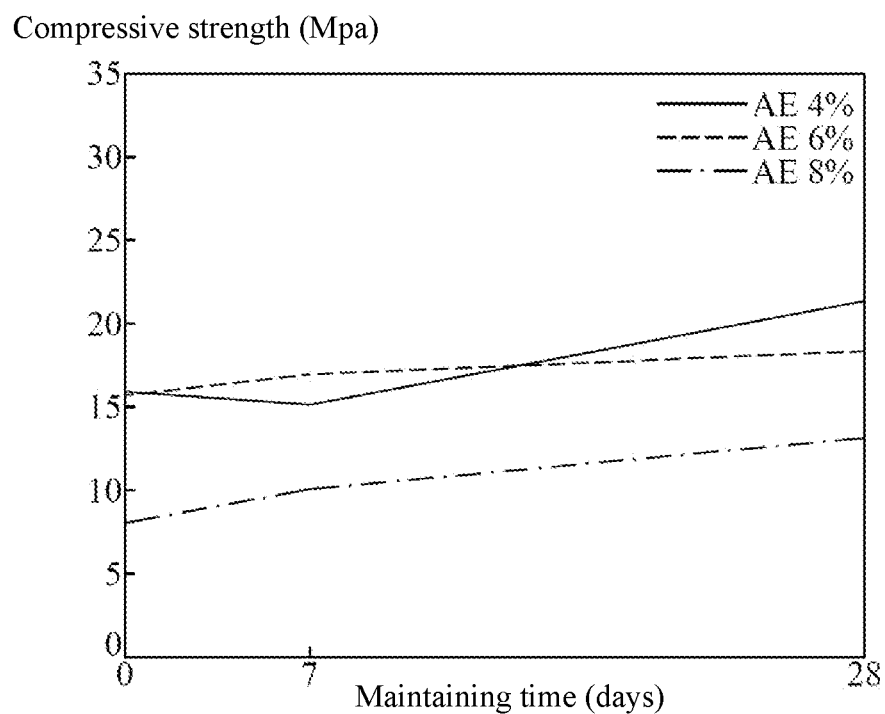
FIG. 7 is a curve graph showing compressive strength of the inorganic binder under 2 Mpa for 4 hours from 0 to 28 days.

FIG. 1 is a flowchart of a method of manufacturing an inorganic binder by reduction furnace slag. As shown in FIG. 1, the method Si of manufacturing an inorganic binder by reduction furnace slag includes a raw material preparation step S10, a stirring step S20, a maintaining step S30 and a drying step S40.

The raw material preparation step S10 is to provide a powder mixture containing 30 wt % to 55 wt % of reduction furnace slag powder and 45 wt % to 70 wt % of glass powder. The percentages of the reduction furnace slag powder and the glass powder are adjusted to consume a larger amount of furnace slag and provide a higher $SiO_2$ percentage. Generally, the percentage of the reduction furnace slag powder is preferably 45 wt % to 55 w %, and correspondingly, the percentage of the glass powder is preferably 45 wt % to 55 wt %. The glass powder contains more than 85 wt % of $SiO_2$, and the reduction furnace slag powder contains 26 wt % to 62 wt % of CaO, 20 wt % to 32 wt % of $SiO_2$ and 1.8 wt % to 12.5 wt % of $Al_2O_3$.

Here, the source of the glass powder is one or more of common glass, electronic grade glass fiber and glass substrate. The common glass, electronic grade glass fiber and glass substrate is mainly sourced from recycled glass scrap. The common glass, electronic grade glass fiber and glass substrate is pulverized to obtain the glass powder. The glass powder contains more than 85 wt % of $SiO_2$, and may also contain 9 wt % to 15 wt % of CaO. The glass powder mainly serves as a provider of silicon.

The reduction furnace slag powder comes from reduction furnace slag produced in electric arc furnaces or converters of steel plants. Since the steel raw materials are different each time, even if the raw materials added are the same, the composition of the finally obtained reduction furnace slag is different. The reduction furnace slag can be pulverized to obtain the reduction furnace slag powder. Generally, the reduction furnace slag powder further contains less than 20 wt % of MgO, less than 5% of MnO and less than 18% of $Fe_2O_3$.

In contrast with the large difference in the composition of the reduction furnace slag powder each time, the composition of the glass powder is relatively stable. In actual operation, first, the proportions of components in the reduction furnace slag powder may be measured, and then the proportions of the glass powder and the alkali activator added may be adjusted according to the proportions of components in the reduction furnace slag powder. In more detail, a specific surface area of the pulverized reduction furnace slag powder is in a range of 1900 to 2600 cm²/g, and a specific surface area of the glass powder is in a range of 3500 to 5000 cm²/g. Thereby, the surface area of the powder mixture is increased to increase the reaction rate.

The stirring step S20 is to place the powder mixture in a mixing tank, and add an alkali activator to the mixing tank to stir and react to form a mixed slurry. Here, the alkali activator is NaOH, which is cost-effective, but actually, KOH or other lyes may also be used instead. However, when KOH is used as the alkali activator, $Na_2O$ in Equation (1) below is replaced with $K_2O$.

In the mixed slurry, the alkali activator may be added according to the composition of the reduction furnace slag powder, the strength required for the final product binder and the set alkali equivalent and water-binder ratio. Generally, the reduction furnace slag powder has high contents of calcium oxide and magnesium oxide, so only a small amount of alkali activator is needed for activation. In some embodiments, the alkali equivalent is 2% to 7%, preferably 4% to 6%. Correspondingly, the water-binder ratio is 0.25 to 0.4, preferably, 0.3 to 0.35.

Here, the alkali equivalent is defined as Equation (1), and the water-binder ratio is defined as Equation (2).

$$\text{alkali equivalent} = \frac{\text{Weight of Na}_2\text{O in alkali activator}}{\text{Weight of powder mixture}} * 100\%; \text{ and} \qquad \text{Equation (1)}$$

$$\text{water-binder ratio}(W/B) = \frac{\text{Weight of water in alkali activator} + \text{weight of additional water}}{\text{Weight of solid in alkali activator} + \text{weight of powder mixture}}. \quad \text{Equation (2)}$$

The stirring step S20 mainly makes CaO, MgO, MnO and MnS in the reduction furnace slag powder, which expand in volume when they are in water, to react first, so that the binder expands in advance when it is in the mixed slurry state. Then, silicon and aluminum ions in the mixed slurry are dehydrated to initiate a polycondensation reaction to form a hardened silicon-aluminum inorganic polymer. In this way, the volume of the binder can be stable.

In more detail, in the stirring period, the alkali activator and the powder mixture are stirred for 10 to 30 minutes.

Since the reduction furnace slag powder has higher contents of CaO, MgO and MnO that may expand in volume, the maintaining step S30 is to place the mixed slurry in a high-temperature and high-pressure maintaining environment, so that the dehydration of silicon and aluminum ions is enhanced under high temperature and high pressure, which accelerates the polycondensation reaction, and gas molecules and pores in the silicon-aluminum inorganic polymer are reduced, which makes the silicon-aluminum inorganic polymer more hardened, thereby increasing the overall mechanical strength.

Here, in the maintaining step S30, the high-temperature and high-pressure maintaining environment is a temperature of 80 to 250° C. and a pressure of 0.3 to 2.5 MPa, preferably, a temperature of 120 to 230° C. and a pressure of 0.5 to 2 MPa. Here, the maintaining time required is 0.5 to 24 hours, preferably 1 to 6 hours, more preferably less than 2 to 4 hours, which is more in line with the industrial requirement.

The chemical reactions in the stirring step S20 and the maintaining step S30 will be described in detail below. Generally, after $SiO_2$ in the reduction furnace slag powder and the glass powder reacts with NaOH, the original glassy O—Si—O bonding will be destroyed to initiate a dissociation reaction, which is known as alkali activation. The reaction formula is shown in reaction formula (1). Actually, since the reduction furnace slag powder may be different each time, the alkalinity of the reduction furnace slag powder may also be taken into consideration to adjust the added alkali activator and set the alkali equivalent of the reaction.

$\equiv$Si—O—Si$\equiv$+OH$^-$→$\equiv$Si—OH+$\equiv$Si—O$^-$.  Reaction formula (1)

Next, the dissociated silicon-oxygen monomer anions, $\equiv$Si—O$^-$ and $\equiv$Si—OH, continue to react with water to generate $Si(OH)_4$, as shown in reaction formula (2) and reaction formula (3).

$\equiv$Si—O$^-$+$H_2O$→$\equiv$Si—OH+OH$^-$.  Reaction formula (2)

$\equiv$Si—OH+$H_2O$→Si(OH)$_4$.  Reaction formula (3)

Then, $Si(OH)_4$ continues to react with NaOH to form a silicate monomer, as shown in reaction formula (4).

$Si(OH)_4$+NaOH→[Si(OH)$_3$O]$^-$Na$^+$+$H_2O$.  Reaction formula (4)

As the reaction continues, the concentration of the silicate monomer in the mixed slurry continues to increase, so that the polycondensation reaction may be initiated to form a silicate dimer, as shown in reaction formula (5), which continues to undergo polymerization with other silicate monomers to further form a silicon-oxygen framework structure.

OSi(OH)$_3$+Na$^+$O$^-$Si(OH)$_3$+Na$^+$→Na$^+$OSi(OH)$_3$—O—Si(OH)$_3$+NaOH.  Reaction formula (5):

Further, in the reaction formula, part of silicon is substituted by aluminum to form a silicon-aluminum-oxygen framework structure. The reduction furnace slag powder further contains less than 20 wt % of MgO, less than 5% of MnO and less than 18% of $Fe_2O_3$. As a result, after the silicon-aluminum-oxygen framework structure is formed, calcium, magnesium, manganese and sulfur ions are fixed to the framework structure to form stable oxides. After a sufficient maintaining time, a binder with stable volume is obtained. Since the heavy metal ions can be stabilized in the framework structure, no free ions will be formed, which can further avoid environmental pollution caused by heavy metal dissolution.

The drying step S40 is to dry the binder. Here, standing, oven drying or air drying may be used to remove excess water to obtain an inorganic binder cured solid. When in actual use, the inorganic binder cured solid can be used instead of cement and mixed with water and sand to form mortar.

Further, before the maintaining step S30, the method further includes a slurry shaping step S25: placing the mixed slurry in a shaping mold, and holding at an environment of 60 to 100° C. for 40 to 180 minutes, preferably an environment of 80 to 90° C. for 60 to 150 minutes, such that the slurry is preliminarily set for subsequent application.

Hereinafter, the method 51 of manufacturing an inorganic binder by reduction furnace slag will be described with an actual example.

A raw material preparation step S10: Reduction furnace slag powder and glass powder were prepared. After being received this time, reduction furnace slag was pulverized for composition analysis by XRF. The result showed that the reduction furnace slag powder contained 44.92 wt % of CaO, 24.84 wt % of $SiO_2$, 11.02 wt % of $Al_2O_3$, 15.83 wt % of MgO, 0.25 wt % of MnO, 0.81 wt % of $Fe_2O_3$ and 0.80 wt % of $TiO_2$.

Glass from waste glass plants was pulverized for composition analysis by XRF. The result showed that the glass powder contained 87.36 wt % of $SiO_2$, 11.15 wt % of CaO, 0.25 wt % of $Al_2O_3$, 0.27 wt % of $Fe_2O_3$ and 0.63 wt % of $K_2O$.

The reduction furnace slag powder and the glass powder were mixed in a weight ratio of 1:1, and caustic soda flakes (98.31% of NaOH) were added to obtain experimental groups with alkali equivalents of 4%, 6% and 8%. Then, a stirring step S20 was performed. The stirring was performed for 15 minutes.

Next, the mixed slurry was placed in a 3 cm*3 cm*3 cm silicone mold to perform a slurry shaping step S25: the mixed slurry was held in an oven at 80° C. for 120 minutes such that the slurry was preliminarily set.

After the slurry was set, a maintaining step S30 was performed. Different experimental groups were respectively maintained under pressures of 0.5 MPa, 1 Mpa and 2 Mpa for 2 hours and 4 hours. The maintaining environment used was a pressure boiler of a steam chamber. The temperature corresponding to 0.5 Mpa was 155° C., the temperature corresponding to 1 Mpa was 184° C., and the temperature corresponding to 2 Mpa was 215° C. Finally, after being dried, the inorganic binder was placed in a normal-temperature and normal-pressure maintaining environment, and daily compressive strength was measured respectively.

FIG. 2 to FIG. 7 are respectively curve graphs showing the compressive strength of the inorganic binder under different maintaining pressures for different maintaining times from 0 to 28 days. In FIG. 2 to FIG. 7, the maintaining pressure and maintaining time are respectively: 0.5 Mpa, 2 hours; 0.5 Mpa, 4 hours; 1 Mpa, 2 hours; 1 Mpa, 4 hours; 2 Mpa, 2 hours; and 2 Mpa, 4 hours.

As shown in FIG. 2 to FIG. 7, under the same composition, the experimental group with the alkali equivalent of 4%, 28 days after being maintained under the pressure of 2 Mpa, has a compressive strength of 21.4 Mpa, which is the highest. The experimental groups with the alkali equivalents of 4% and 6% may both have a strength of 15 Mpa or above after being cured under the pressures of 1 Mpa and 2 MPa. Under the maintaining pressure of 0.5 Mpa, only the 4% experimental group and some of the 6% experimental group can reach the compressive strength of 15 Mpa In addition, the inorganic binder was analyzed for the dissolution of toxic substances. The dissolution concentrations measured were compared with the Taiwan Environmental Protection Administration (EPA) standard and international standards, as shown in Table 1. It can be understood that through the silicon-aluminum-oxygen framework structure, heavy metal ions are captured for coordination, such that the dissolution concentrations are all lower than the international standards. Therefore, compared with directly burying the reduction furnace slag, the method of the disclosure may reduce the impact on the environment.

TABLE 1

| Item analyzed | Limit of Quantitation | Unit | Analysis result | Taiwan EPA Dissolution standard | EU RoHS Dissolution standard | US EPA Dissolution standard |
| --- | --- | --- | --- | --- | --- | --- |
| As | 0.116 | mg/L | ND(<0.116) | 5.0 | | 5.0 |
| Ba | 0.013 | mg/L | 0.332 | 100.0 | | 100.0 |
| Cd | 0.009 | mg/L | ND(<0.009) | 1.0 | 100 | 1.0 |
| Cr | 0.009 | mg/L | ND(<0.009) | 5.0 | | 5.0 |
| Cu | 0.011 | mg/L | ND | 15.0 | | |
| Pb | 0.0578 | mg/L | 0.062 | 5.0 | 1000 | 5 |
| Se | 0.3393 | mg/L | ND | 1.0 | | 1.0 |
| Hg | 0.005 | mg/L | 0.067 | 0.2 | 1000 | 0.2 |
| $Cr^{6+}$ | — | mg/L | 0.026 | 2.5 | 1000 | |

Based on the above, by adding the waste glass and the reduction furnace slag powder, the overall silicon content can be increased. Therefore, under the alkali activation of the alkali activator, silicon and aluminum ions in the slurry can be dehydrated to initiate a polycondensation reaction so as to form a silicon-aluminum-based network architecture, which can become a hardened cured solid after being maintained and dried. The cured solid has sufficient strength to serve as a structure. Besides, the heavy metals in the reduction furnace slag can be wrapped in the network architecture, such that their dissolution is far below the standard. Thereby, the reduction furnace slag can be reutilized effectively, and recycled at low cost on a large scale, which can reduce the problems caused by burying. Moreover, the reduction furnace slag can be reused, thereby effectively reducing the impact on the environment.

What is claimed is:

1. A method of manufacturing an inorganic binder by reduction furnace slag, comprising:
   a raw material preparation step: providing a powder mixture containing 30 wt % to 55 wt % of reduction furnace slag powder and 45 wt % to 70 wt % of glass powder, wherein the glass powder contains more than 85 wt % of $SiO_2$, and the reduction furnace slag powder contains 26 wt % to 62 wt % of CaO, 20 wt % to 32 wt % of $SiO_2$ and 1.8 wt % to 12.5 wt % of $Al_2O_3$;
   a stirring step: placing the powder mixture in a mixing tank, and adding an alkali activator to the mixing tank to stir and react to form a mixed slurry, wherein an alkali equivalent (AE) of the mixed slurry is 2% to 7%, and a water-binder ratio is 0.25 to 0.4;
   a maintaining step: placing the mixed slurry in a high-temperature and high-pressure maintaining environment for a maintaining time to get a binder, wherein the high-temperature and high-pressure maintaining environment is a temperature of 80 to 250° C. and a pressure of 0.3 to 2.5 MPa, and the maintaining time is 0.5 to 24 hours; and
   a drying step: drying the binder to remove excess water, to thereby obtain an inorganic binder cured solid;
   wherein the alkali equivalent is defined as Equation (1), and the water-binder ratio is defined as Equation (2), $$\text{alkali equivalent} = \frac{\text{Weight of Na}_2\text{O in alkali activator}}{\text{Weight of powder mixture}} * 100\%; \text{ and} \quad \text{Equation (1)}$$

$$\text{water-binder ratio}(W/B) = \frac{\text{Weight of water in alkali activator} + \text{weight of additional water}}{\text{Weight of solid in alkali activator} + \text{weight of powder mixture}}. \quad \text{Equation (2)}$$

2. The method of manufacturing an inorganic binder by reduction furnace slag according to claim 1, wherein the alkali activator is NaOH, and the alkali equivalent of the mixed slurry is 4% to 6%.

3. The method of manufacturing an inorganic binder by reduction furnace slag according to claim 1, wherein before the maintaining step, the method further comprises a slurry shaping step: placing the mixed slurry in a shaping mold, and holding at an environment of 60 to 100° C. for 40 to 180 minutes.

4. The method of manufacturing an inorganic binder by reduction furnace slag according to claim 1, wherein the reduction furnace slag powder further contains less than 20 wt % of MgO, less than 5% of MnO and less than 18% of $Fe_2O_3$.

5. The method of manufacturing an inorganic binder by reduction furnace slag according to claim 1, wherein the source of the glass powder is selected from the group consisting of common glass, electronic grade glass fiber and glass substrate.

6. The method of manufacturing an inorganic binder by reduction furnace slag according to claim 1, wherein the glass powder further contains 9 wt % to 15 wt % of CaO.

7. The method of manufacturing an inorganic binder by reduction furnace slag according to claim 1, wherein a specific surface area of the reduction furnace slag powder is in a range of 1900 to 2600 $cm^2/g$, and a specific surface area of the glass powder is in a range of 3500 to 5000 $cm^2/g$.

8. The method of manufacturing an inorganic binder by reduction furnace slag according to claim 1, wherein the high-temperature and high-pressure maintaining environment is a temperature of 150 to 230° C. and a pressure of 0.5 to 2 MPa, and the maintaining time is 2 to 4 hours.

9. The method of manufacturing an inorganic binder by reduction furnace slag according to claim 1, wherein the alkali activator and the powder mixture are stirred for 10 to 30 minutes.

10. An inorganic binder cured solid, manufactured by the method of manufacturing an inorganic binder by reduction furnace slag according to claim 1.

11. An inorganic binder cured solid, manufactured by the method of manufacturing an inorganic binder by reduction furnace slag according to claim 2.

12. An inorganic binder cured solid, manufactured by the method of manufacturing an inorganic binder by reduction furnace slag according to claim 3.

13. An inorganic binder cured solid, manufactured by the method of manufacturing an inorganic binder by reduction furnace slag according to claim 4.

14. An inorganic binder cured solid, manufactured by the method of manufacturing an inorganic binder by reduction furnace slag according to claim 5.

15. An inorganic binder cured solid, manufactured by the method of manufacturing an inorganic binder by reduction furnace slag according to claim 6.

16. An inorganic binder cured solid, manufactured by the method of manufacturing an inorganic binder by reduction furnace slag according to claim 7.

17. An inorganic binder cured solid, manufactured by the method of manufacturing an inorganic binder by reduction furnace slag according to claim 8.

18. An inorganic binder cured solid, manufactured by the method of manufacturing an inorganic binder by reduction furnace slag according to claim 9.

\* \* \* \* \*